Nov. 21, 1944.  E. B. SCHERL  2,363,089
WELDING PROCESS AND APPARATUS
Filed Aug. 21, 1942  2 Sheets—Sheet 1
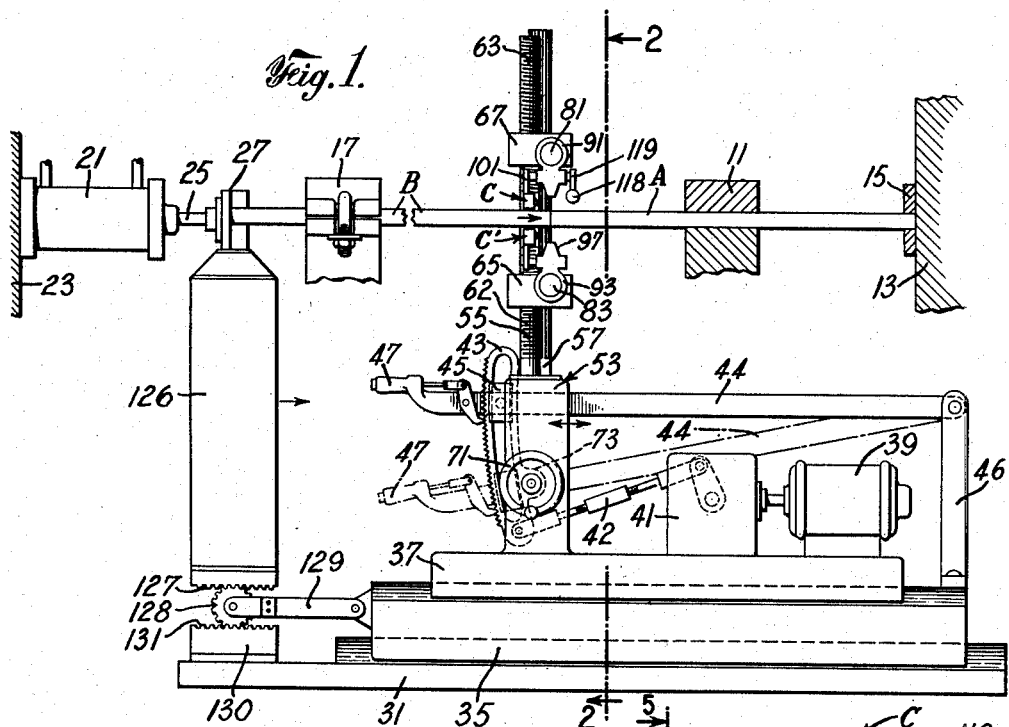
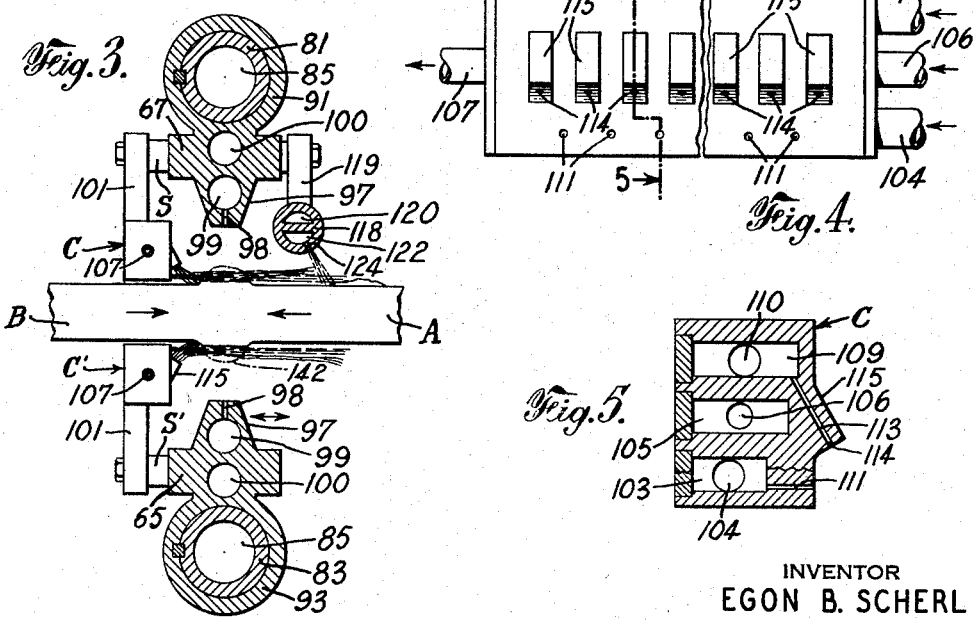
INVENTOR
EGON B. SCHERL
BY
ATTORNEY Nov. 21, 1944.  E. B. SCHERL  2,363,089
WELDING PROCESS AND APPARATUS
Filed Aug. 21, 1942  2 Sheets-Sheet 2
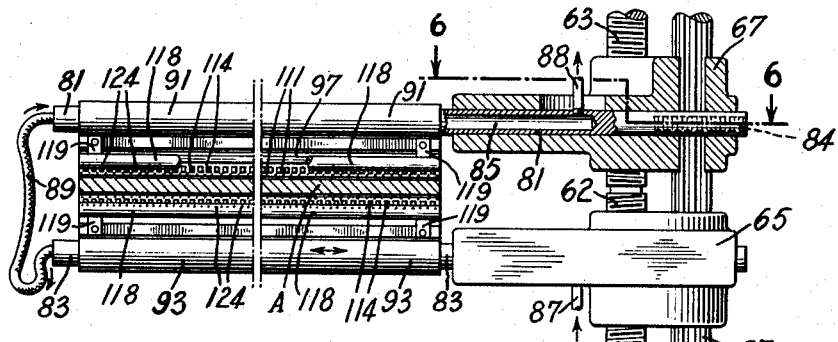
Fig. 2.
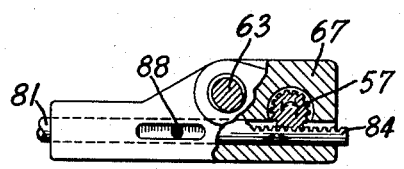
Fig. 6.
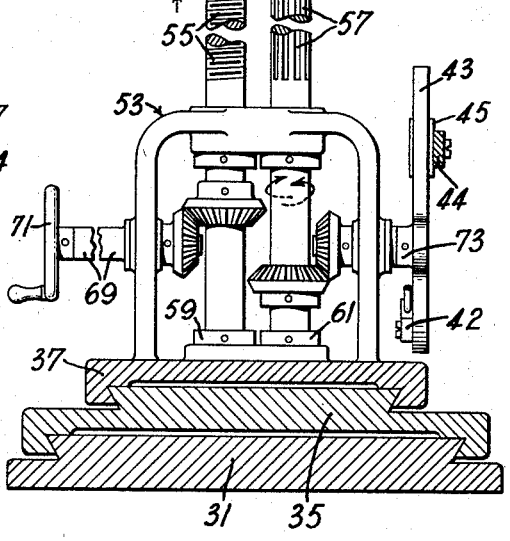
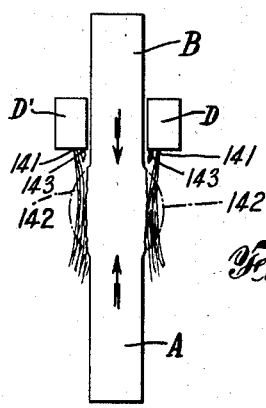
Fig. 7.
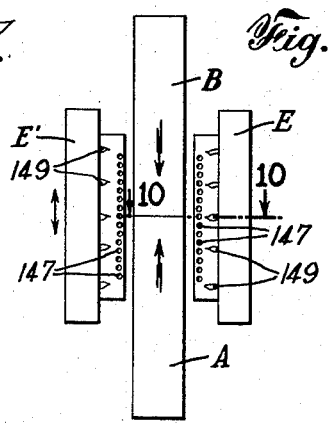
Fig. 9.
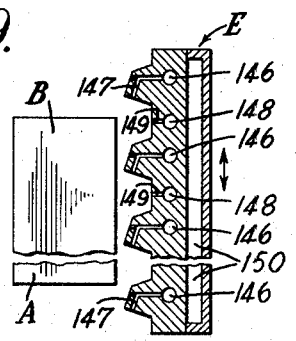
Fig. 10.
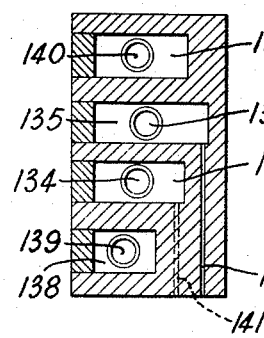
Fig. 8.
INVENTOR
EGON B. SCHERL
BY
ATTORNEY Patented Nov. 21, 1944

2,363,089

UNITED STATES PATENT OFFICE 2,363,089

WELDING PROCESS AND APPARATUS

Egon B. Scherl, Niagara Falls, N. Y., assignor to The Linde Air Products Company, a corporation of Ohio Application August 21, 1942, Serial No. 455,565

19 Claims. (Cl. 29—33)

This invention relates to the art of butt-welding. More especially it concerns a method and apparatus for the production of welded metal structures of great strength from weldable metal members of either uniform or non-uniform cross-section, preferably using as source of welding heat an oxy-acetylene or other combustible gas mixture in conjunction with one or more streams or sheets of a gas adapted to effect rapid combustion of selected portions of the metal with evolution of welding heat. The invention has especial utility in connection with welding processes wherein the surfaces to be welded are abutted and pressed together under relatively high pressure while concurrently the metal at and adjacent the abutting surfaces is heated to a welding temperature not substantially above the solidus temperature of such metal. This type of process is described in United States Patent No. 2,231,027 of O. Renner, Jr., and in United States Patent No. 2,231,014 of A. R. Lytle, W. Morton and L. V. Spangberg.

In the preparation of members of weldable metal for welding at temperatures below the liquidus or fusion temperature of the metal, it generally is the practice to prepare the surfaces to be joined by a grinding or other machining or equivalent operation for removing oxides and other objectionable impurities and insuring good contact of the members being welded during application of the welding heat. The present invention preferably utilizes such surface preparation procedures.

During this type of welding operation the heat and pressure effective at and adjacent the abutting surfaces in the welding zone force the plastic metal laterally, thereby forming an external elongated upset area or ridge of metal which progresses outwardly within the path of the heating gases as the upsetting continues. In processes employed heretofore it has been the practice, following the completion of the welding operation and the heat treatment of the welded joint, to remove such upset metal by suitable means,— when removal thereof is desired—as by grinding; or by means of one or more cutting torches applied to the heat-treated joint.

The present invention is based upon the discovery that the aforesaid separate step of removing upset metal may be eliminated, and that such metal may be removed progressively during the actual welding operation, by the suitable use of a gas consuming the metal by thermochemical reaction, such as oxygen, supplied as a plurality of jets or a continuous sheet so directed that the outwardly extruding metal at the welding zone progresses into the plane of an oxygen curtain thus produced at approximately the rate at which the upset metal is formed at the welding zone. In certain instances it is essential to utilize such oxygen curtain in conjunction with the continuous or intermittent use of oxy-fuel gas mixtures for insuring a metal combustion of sufficient uniformity to provide the necessary continuity of the welding operation.

It has been found that by this process considerable economies are effected over prior procedures wherein the upset metal is removed by a separate grinding or other separate operation following the welding and heat-treating operations. Such economies may be due in part to the fact that, since the upset metal is progressively removed as formed, the cross-section of the members at the joint being formed is practically uniform during the welding operation, whereby the heating efficiency of the gas is maintained throughout such operation. Moreover, a large portion of the heat required for the welding operation is generated immediately at the surface of the metal, due to the metal-oxygen reaction, whereby heat is transferred by conduction through the metal to the interface formed by the abutting surfaces.

Among the more important objects of the invention are:

In a welding process conducted at temperatures not substantially higher than the solidus temperature of the metal, to provide for progressively removing upset metal from the welding zone substantially as the upsetting occurs; in a process for welding members of weldable metal wherein a body of upset metal is extruded laterally at a welding zone, to provide for generating welding heat immediately at the surface of the upset metal by combustion of at least a part of the latter; and to provide in such a welding process for adjusting the heat input of the metal at the welding zone during the metal-upsetting stage in accordance with the thickness at the welding zone of the members being welded and the amount of upsetting. These and other objects will be apparent as the following description proceeds.

The process of the present invention preferably comprises the successive steps of preparing the surfaces to be welded, by a grinding or machining operation (a chemical treatment to remove oxide film may suffice in certain instances); accurately aligning the members being welded with the prepared surfaces in abutting relation; welding the abutting surfaces, preferably by a modification of the oxy-fuel gas welding procedure while forcing such surfaces together under high pressure, e. g., pressure around 500 to 5000 pounds or more per square inch; and regulating the heat of the heated zone at and adjacent the interface formed by the abutting surfaces, the amount and distribution of welding heat and the amount of pressure applied at the abutting surfaces being so correlated that the amount and direction of flow of upset metal are closely controlled. Concurrently with the welding step, and either continuously or intermittently after upsetting of the metal has begun, the upset highly heated metal moving laterally beyond the original margins of the members at the welding zone enters a combustion zone where it encounters one or more streams or jets of oxygen or equivalent gaseous metal-consuming and cutting medium, or a continuous sheet thereof, and is consumed with the production of a large quantity of welding heat immediately at the surface of the upset metal. Thus, the latter is progressively consumed during the welding operation as it advances into the plane of the oxygen jets or curtain.

Welding of the metal members at the joint, and the accompanying shortening of the members, continue uninterruptedly as long as sufficient pressure is maintained at the abutting surfaces to provide extruded or upset metal within the zone of the oxygen jets or curtain for combustion by the latter. The welding speed is greatly increased by this procedure, due to the continuous removal of upset metal at the joint, and to the resultant more efficient application of heat to the members at the welding zone due to the fact that much of the welding heat generated at the surfaces of the members by combustion of upset metal is conducted directly to all parts of the abutting surfaces. This limits the amount of welding heat that, in the absence of such heat of combustion, must be supplied by radiation and convection from oxy-fuel gas welding flames spaced from the members being welded.

After a preselected shortening of the members being welded has occurred,—the amount thereof depending upon such factors as the thickness of the members being welded, the composition of the members, the finish of the abutting surfaces, and the amount of abutting pressure employed,— the oxygen jets and oxy-fuel gas flames are discontinued, and the pressure is released.

The heating operation may be regarded as consisting of two stages, the first of which involves the preheating of the members at the abutting surfaces prior to the initiation of metal upsetting; and the second of which continues from that stage until the welding is complete, and involves combustion of the upset metal as formed. During the preheating stage the heating torches and jets preferably are reciprocated across the interface defined by the abutting surfaces of the members being welded along a fixed path of selected length. During the step of combusting the upset metal, the torches and oxygen jets preferably are reciprocated, or oscillated in a fixed path disposed parallel to said interface.

The use of supplementary preheating gas flames in conjunction with the oxygen jets facilitates the initiation of the cutting action at the commencement of the metal-upsetting stage, since only a small amount of heat beyond that furnished by the main welding torch suffices to bring to the ignition temperature the upset metal upon which the oxygen jets impinge. Consequently, abutting pressures equal to or greater than that used during the metal-upsetting or shortening stage may be used during the preshortening stage to effect a prompt initiation of upsetting and, therefore, combustion. When welding metal members of around three-quarters of an inch or less in thickness, the main blowpipe gas jets may be discontinued after the cutting of the upset metal has been initiated.

In certain instances it is desirable to employ, during the initial preheating state, an abutting pressure lower than that used during the metal-upsetting stage, in order to prevent undue upsetting of the metal before the temperature at the surface of the metal members is sufficiently high to permit the oxygen jets to initiate the cutting action.

The welded joint may be thereafter annealed by means of a suitable heat-treatment. That described in the aforesaid United States Patent No. 2,231,014, involving the application of heat-treating flames to the welded joint along a zone of selected length extending on each side of the original interface between the members, is especially efficacious.

Referring to the accompanying drawings wherein are illustrated certain forms of apparatus for carrying out the process features of the invention, Fig. 1 is a somewhat diagrammatic front view of one form of apparatus, parts being broken away, and other parts omitted;

Fig. 2 is a section taken along the line 2—2 of Fig. 1, looking in the direction of the arrows, parts being broken away, and other parts omitted;

Fig. 3 is a fragmentary transverse section on an enlarged scale through one form of heating unit at a joint being welded, parts being broken away, and other parts omitted;

Fig. 4 is a fragmentary front view, on an enlarged scale, of the orifice bar C, shown in Fig. 3, parts being broken away;

Fig. 5 is a section taken along the line 5—5 of Fig. 4, looking in the direction of the arrows, parts being broken away;

Fig. 6 is a section taken along the line 6—6 of Fig. 2, looking in the direction of the arrows;

Fig. 7 is a diagrammatic view of another form of heating unit, showing members being welded;

Fig. 8 is a fragmentary transverse section, on an enlarged scale, through one of the heating units of Fig. 7;

Fig. 9 is a diagrammatic view from below of still another form of heating unit, and members being welded thereby; and Fig. 10 is a fragmentary section, on an enlarged scale, taken along the line 10—10 of Fig. 9, looking in the direction of the arrows.

Referring to Fig. 1 of the drawings, two members A, B of weldable metal—which may be plates, rods, or other articles—are secured with a surface of each in abutting relation. The member A is secured by a suitable clamping member 11 upon a fixed support (not shown), which may be integral with an end-supporting and thrust member 13 having a centering plate 15. The member B is secured by a clamping member 17, similar to clamp 11, upon a support (not shown) free to move in the direction of movement of the member B during the metal-upsetting stage of the welding operation.

For forcing together under high pressure the abutting surfaces of members A, B during a welding operation, one or a plurality of laterally spaced fluid pressure-operated cylinders 21 are supported in any suitable manner on a fixed support 23. (Only one cylinder 21 is shown.) Each cylinder has a piston 25 adapted to engage a thrust plate 27 operatively interposed between the piston and the member B, and supported for limited movement in the direction of shortening of members A, B, as hereinafter described.

For reciprocating a source of welding heat along a selected area of the members A, B, across the interface formed by the abutting surfaces being welded, and for removing upset metal from the welding zone continuously as formed, or intermittently when desired, there is provided, in the form illustrated in Fig. 1, a fixed support 31 carrying thereon a supporting member 35 for longitudinal sliding movement with respect thereto. A torch-supporting member 37 is mounted on the member 35 for limited sliding movement relative to the latter.

For reciprocating the member 37 longitudinally of member 35 at a selected rate along a fixed path of predetermined length, and for permitting discontinuation of such movement at midstroke, an electric motor 39, driven from a suitable source of power, is operatively connected with the member 35 through a reduction gear 41; a longitudinally adjustable crank arm 42 having its ends pivotally connected, respectively, with a crank on the gear 41, and with an end portion of an elongated slotted link 43 secured upon a rotatable shaft 73; and a lever 44 having secured thereto a hollow block 45 adapted to slide within the slot in link 43, one end of the lever being pivotally connected with a post 46 rigidly secured upon member 35, and the other end of the lever having a handle 47 provided with a well known hand-actuated locking member cooperating with serrations on the link for regulating the length of the path of movement of member 37 with respect to member 35 within a range from substantially zero movement to a maximum. The motor and reduction gear are mounted upon slidable member 37. During operation of motor 39, the plate 37 and parts carried thereby are reciprocated along member 35. During the first or preheating stage of the welding operation, the path of travel of the member 37 and torch headers carried thereby across the interface between members is adjusted to a preselected length, depending upon the thickness of the members being welded. At the commencement of the stage of upsetting of the metal and the use of cutting oxygen, this path of travel is reduced to at least approximately zero by moving lever 44 to the neutral position shown in dotted lines in Fig. 1.

Mounted upon member 37 is a supporting frame 53 of inverted U-shape (see Fig. 2) having two apertures in its upper end housing bushings through which extend two rotatable shafts 55 and 57, the lowermost ends of the shafts being supported, respectively, in thrust bearings 59 and 61 carried by member 37. The shaft 55 has spaced oppositely threaded portions 62, 63, adapted to cooperate with corresponding internal threads in two heating-head brackets 65, 67, whereby rotation of the shaft moves the heads either toward or away from each other, in obvious manner. A bevel gear secured on shaft 55 meshes with a mating gear on a short shaft 69 having an operating handle 71 for adjusting the spacing of the heating heads 65, 67.

A portion of the shaft 57 has longitudinal flutes extending freely through apertures within the brackets 65, 67. A bevel gear secured to shaft 57 meshes with a bevel gear secured upon a short shaft 73 journalled in the frame 53. Thus, rocking movement of link 43 under action of crank arm 42 causes oscillation of the fluted shaft 57 without shifting brackets 65, 67 relative to each other; while rotation of wheel 71 moves the brackets toward or from each other independently of any movement of shaft 57.

Each of the brackets 65, 67 carries a corresponding torch header supporting arm 81, 83, keyed for sliding movement within a passage in such bracket. As shown in Fig. 6, one end of each arm 81, 83 has a rack portion 84 adapted to mesh with the flutes on shaft 57, whereby rotation of the latter moves the arms 81, 83 as a unit in a plane transverse to the path of relative movement of members 35, 37. Each arm 81, 83 has a passage 85 therethrough for circulation of a cooling fluid. A fluid inlet line 87 extends through a longitudinal slot in bracket 65 and connects arm 83 with a source of coolant under pressure. A fluid outlet line 88 extends through a corresponding slot in bracket 67. A flexible tubing 89 connects the passages 85.

Each torch header arm 81, 83 has keyed thereto and supports a corresponding torch header 91, 93, respectively having an elongated nozzle portion 97 provided with a plurality of closely spaced parallel discharge passages 98 for an oxy-fuel gas mixture communicating with a gas manifold 99. A passage 100 for a cooling fluid is provided adjacent the manifold 99. The respective headers 91, 93 are arranged to discharge an oxy-fuel gas mixture on opposite surfaces of the abutting members to be welded, the latter being interposed between these headers during a welding operation, as shown in Figs. 1 to 3.

For directing a plurality of jets of oxygen or the equivalent into the path of the upset metal during the upsetting operation, elongated cutting fluid orifice bars C, C' (Figs. 1 to 3) are supported by spaced clamps 101, suitably secured to the headers 91, 93, by spacer members S, S', as shown in Fig. 3. Each orifice bar C, C', in the form shown in Figs. 3 to 5, has therethrough a passage 103 for cutting oxygen, fed from inlet line 104 (see Figs. 4 and 5); a passage 105 for a cooling fluid, having inlet and outlet lines 106, 107; and a passage 109 for an oxy-fuel gas mixture, fed from inlet line 110. A plurality of closely spaced parallel passages 111 communicate with passage 103 and discharge a plurality of jets of cutting oxygen, preferably in the form of a high velocity sheet or substantially continuous curtain, transversely across the abutting margins of members A, B, and into contact with the upset portions 142 of the members at the welding zone.

As shown in Figs. 4 and 5, a plurality of sloping parallel passages 113 in bars C, C' conduct an oxy-fuel gas mixture from passage 109 to a plurality of closely spaced ports 114 in the stepped surfaces 115. Preferably the ports 114 are respectively disposed in transverse planes through the orifice bar intermediate the planes in which the respective oxygen passages 111 are disposed, and direct a combustible mixture upon the metal members at the welding zone.

For preventing hot slag from collecting on the upper surfaces of the members being welded at and adjacent the welding zone during the metal-upsetting and metal-consuming operation, the upper torch header 91 and, if desired, the header 93, supports an air blast header 118 by means of spaced clamps 119. The air header 118 has a passage 120 for a cooling fluid, provided with the usual inlet and outlet (not shown). This header also has a passage 122 for high pressure air, connected with an air inlet (not shown). A plurality of discharge ducts 124 impinge a plurality of closely spaced streams of high velocity air or other substantially inert gas upon the members being welded at points beyond the welding zone in the direction of flow of oxygen from orifice bars C, C', thereby entraining and removing the slag as it is formed.

To provide for automatically advancing the carriage supporting the torch heads and orifice bars at one-half the travel of the movable clamp 17 and the associated member being welded throughout the upsetting and shortening stage, thrust plate 27 (see Fig. 1) is secured to a member 126 which has a rack 127 on its lower surface meshing with a pinion 128 that is pivotally connected with the forward end of member 35 by a link 129, and has an opposite bifurcated end rotatably mounted on the axle of pinion 128. A fixed supporting member 130 mounted on table 31 has a rack 131 meshing with pinion 128. During the pressure welding operation, as members A and B upset at the joint and become shortened, and the member 126 moves toward the right (see Fig. 1), the latter acts through pinion 128 to move the plate 35 and parts carried thereby one-half the distance through which the piston 25 moves, or the amount by which the member B is shortened.

Figs. 7 and 8 illustrate somewhat diagrammatically another type of orifice bar D, D' adapted to be supported on opposite sides of the members A, B being welded, for reciprocation in one or more planes, as in the case of the apparatus of Figs. 1 to 6. Each header D, D' has a passage 133 for cutting oxygen connected with an inlet line 134; a passage 135 for an oxy-fuel gas mixture, connected with an inlet line 136; and passages 137, 138 for circulating a cooling fluid, and respectively connected with a fluid inlet line 139 and an outlet line 140. A plurality of closely spaced oxygen ducts 141 discharge an aligned series of jets of oxygen upon the upset metal 142 at the welding zone (see Fig. 7); and a plurality of closely spaced gas ducts 143 lying between the oxygen ducts and the work are directed to discharge a series of jets of combustible gas upon the upset metal at points spaced laterally of the work, and between the latter and the oxygen jets. Secondary air may be aspirated into the zone beneath the oxygen jets by the gas from ducts 143.

Figs. 9 and 10 illustrate one type of heating and cutting orifice bar especially designed for carrying out a pressure butt-welding operation wherein the cutting jets are directed to discharge oxygen longitudinally of the ridge of upset metal being formed. Here each orifice bar E, E' has a plurality of passages 146 for conducting cutting oxygen to a series of closely spaced discharge ducts 147 directed to discharge oxygen at an acute angle upon the ridge of upset metal in a general plane that includes such ridge; and a plurality of passages 148 for conducting an oxy-fuel gas mixture to a series of closely spaced gas discharge ducts 149. Each bar E, E' also is provided with a passage 150 for the circulation of a cooling fluid, having the usual inlet and outlet (not shown). This type of heating and cutting orifice bar may be substituted for the heating head and orifice bar shown in Figs. 1 to 5. The heating gas ducts 149 of Figs. 9 and 10 correspond to the heating gas ducts 98 of Figs. 1 to 5. Reciprocation of the orifice bars longitudinally of the ridge of upset metal equalizes the actions of both the preheating flames and the cutting jets within the welding zone. In operations where the oxygen jets are directed longitudinally of the welded zone, jets of relatively low oxygen velocity preferably are used. It is usually desirable to conduct the welding operation with the interface between abutting members lying in a horizontal plane when using this type of orifice bar.

The following description illustrates one preferred form of the invention. The metal members are secured with surfaces thereof in abutting relation under pressure. During the initial or preheating stage of a welding operation, before upsetting of metal occurs, and prior to the use of cutting oxygen, the torch headers 91, 93 are reciprocated back and forth across the interface formed by the abutting surfaces at a selected rate and along a uniform path of fixed length, upon actuation of motor 39 and adjustment of lever 44. Concurrently, the headers 91, 93 are reciprocated longitudinally of the said interface under action of motor 39 and the members 41 to 43. As soon as upsetting of metal at the welding zone commences, reciprocation of the torch headers across the interface is discontinued at a position wherein the oxy-fuel gas discharge passages 98 are directed upon the interface, or approximately upon the center of the ridge 142 of upset metal being formed (see Fig. 3). This is accomplished by moving the lever 44 to its lowermost position (see Fig. 1). The cutting orifice bars are thereby disposed at the correct distance from the ridge 142 for complete removal of the upset metal by spacer members S, S' (see Fig. 3).

Oxy-fuel gas jets are then directed into the welding zone through ports 114; and the flow of heating gas through passages 98 is cut off; while reciprocation of the torch headers 91, 93 longitudinally of the ridge of upset metal is continued. Preferably simultaneously therewith, oxygen under pressure is directed upon the upset metal from passages 111 in the orifice bars. The path of reciprocation of the headers longitudinally of the welding zone is at least as long as the distance between adjacent oxygen ducts, hence the surface from which the upset metal is removed remains substantially smooth and free from corrugations. The preheating gas passages 98 remain directed upon and in fixed relation to the ridge of upset metal throughout the upsetting and shortening stage due to the coaction of members 127 to 130 and associated parts. Gas jets from these passages may be lighted in instances where, for any reason, the rate of metal upsetting is insufficient to provide enough extruded metal for supplying, by combustion thereof, the heat required for completing the welding operation.

The present invention is well adapted for the welding of pipes and other tubular members. When welding such members, they may be supported for rotation upon their longitudinal axes; and means may be provided for rotating these members during the welding operation, while their abutting surfaces are forced together under high pressure. The welding and trimming torch header 91 of Fig. 3 may be replaced by a similar one of annular shape. The latter may be sectional, with the sections retractible from the welding position. The torch header 93 of Fig. 3 may be replaced by an annular or a generally disc-shaped torch header, which may be disposed centrally within the tubular members. Hot combustion gases are removed by an induced flow of air within the members. The general apparatus arrangement conveniently may be that disclosed in the pending application Serial No. 350,680 of A. R. Lytle and W. Morton, for "Pressure welding process and apparatus," filed August 3, 1940. The interarrangement of welding gas jets and associated oxygen jets in each torch header preferably is similar to that hereinbefore described in connection with Figs. 3 to 5, when directing the oxygen streams transversely of the ridges of upset metal; and generally similar to that shown in Figs. 9 and 10, when the oxygen streams are directed longitudinally of such ridges.

The invention has distinct value for welding metal members of irregular cross-section. Thus, in the present process, as distinct from prior pressure welding processes, the heat input to the zone of the weld, during the welding and the concurrent shortening of the members at the joint, varies with the thickness of the plates or other members being welded, and adjusts itself to such thickness. This occurs because the width of the heated zone—which determines the heat input resulting from combustion of the upset metal— is governed by the width of the ridges of the upset metal; and this in turn is a function of the thickness of the members being welded.

When welding members of irregular cross-section, such as rails, separately controlled torch headers may be disposed to direct welding flames and oxygen jets respectively, on the top, bottom and each side of each of the rails at and adjacent the abutting ends. For this purpose, welding apparatus of the general type described in the aforesaid U. S. Patent No. 2,231,014 may be used, in conjunction with torch headers of the general nature of the headers 91, 93 and associated orifice bars described herein.

It will be understood that the various fuel gas, oxygen and air conduits leading to the torch heads and orifice bars are provided with the usual pressure regulators and cut-off valves; and that the lines circulating cooling fluid through these parts are provided with cut-off valves.

Although certain forms of apparatus suitable for use with the invention have been described, it will be evident that many other forms may be utilized without departing from the spirit of the invention. Thus, the torch header advancement mechanism consisting of members 126 to 131 and 31 may be eliminated by installing at the end of the member A one or more hydraulic cylinders and thrust plates corresponding to the hydraulic cylinders 21 and thrust plates 27 shown in Fig. 1— and opposing cylinders 21.

While the invention has been illustrated in connection with the welding of metal articles in the shapes of plates and pipes, it may be used generally for the welding of metal articles, including those of irregular cross-section, such as rails.

The term "metal-combusting gas" and similar terms are used in the claims to designate not only oxygen but also ozone; air; mixtures of oxygen with inert gases, such as air and oxygenated air; and mixtures containing oxygen with combustible gases such as acetylene, hydrogen, carbon monoxide and the like; which are capable of rapidly oxidizing and consuming metal exposed thereto while at its kindling temperature in that gas.

The term "periphery" is employed in the claims in its usual sense to designate the perimeter or margin of the interface formed by abutting surfaces of plates, bars, pipes and the like to be united.

I claim:

1. Process for butt-welding members of weldable metal, which comprises placing surfaces of said members in abutting relation and forcing said members together under a high pressure while heating the metal at and adjacent the interface formed by the abutting surfaces to a welding temperature not substantially higher than the solidus temperature of the metal, thereby upsetting metal at and adjacent the abutting surfaces; and progressively flowing such upset metal into the path of at least one jet of a metal-combusting gas directed to consume at least the major portion of such upset metal and to supply welding heat to adjacent portions of the members, thereby progressively welding the members at the said interface while under high pressure and while maintaining at least two lateral surfaces of the members at the welded zone in preselected size and shape.

2. Process for butt-welding members of weldable metal, which comprises placing surfaces of said members in abutting relation; forcing said members together under high pressure while heating the metal at and adjacent the interface formed by the abutting surfaces to a welding temperature not substantially higher than the solidus temperature of the metal, thereby upsetting metal at and adjacent the abutting surfaces; and progressively flowing such upset metal while at its ignition temperature into the path of a high velocity curtain of oxygen directed to consume at least the major portion of such upset metal as formed and to supply welding heat to the metal immediately adjacent said abutting surfaces, thereby concurrently converting the outer margins of the abutting portions of the members to a selected shape and size, preventing the melting of said metal at the original interface between said members, and providing a relatively smooth welded joint.

3. Process for butt-welding members of weldable metal, which comprises forcing together under high pressure the abutting surfaces of two members to be welded; directing welding flames upon at least two opposite lateral surfaces of said members adjacent the interface defined by the abutting surfaces while reciprocating said flames longitudinally of said interface, thereby heating the metal at and adjacent such interface to a welding temperature not substantially higher than the solidus temperature of the metal, while maintaining said pressure; progressively upsetting metal of said members at the welding zone thus created; and thermochemically consuming such upset metal as formed by a plurality of closely spaced jets of a metal-combusting gas reciprocated longitudinally of said interface, thereby controlling the size and shape of the members at said interface while concurrently generating welding heat in contact with the metal immediately at the welding zone and conducting such heat directly to the abutting surfaces.

4. Process for butt-welding members of weldable metal, which comprises placing surfaces of said members in abutting relation; pressing said members together with said surfaces in such abutting relation while heating to a welding temperature the metal at and adjacent the interface formed by the abutting surfaces, thereby initiating the welding of the members at said interface; and progressively forcing upset metal outwardly at a lateral margin of said interface into the path of a stream of a metal-consuming gas, while such upset metal is at its ignition temperature, and while causing relative movement between said path of the metal-consuming gas and said interface in a direction longitudinally of the latter, thereby consuming and removing such upset metal as formed and generating additional welding heat at the surfaces of the members immediately adjacent said interface, for completing the welding of said members.

5. Process for butt-welding members of weldable metal, which comprises placing surfaces of said members in abutting relation; pressing said members together while heating the metal members at and adjacent said abutting surfaces to a welding temperature by means of heat conducted to said surfaces from oxy-fuel gas flames directed upon said members at and adjacent said surfaces within a welding zone, thereby initiating the welding of the members at the interface formed by such contacting surfaces and forcing upset metal outwardly at a lateral margin of said interface; and progressively forcing successive portions of such upset metal while at its ignition temperature into the path of a sheet of a cutting gas containing oxygen directed to contact the ridge of upset metal thus formed, thereby combusting and removing the upset metal as formed, supplying additional welding heat to the members immediately adjacent said interface, while maintaining the lateral margins of the members within the welding zone in preselected shape and size, and providing a relatively smooth welded joint of selected surface contour.

6. Process for butt-welding members of weldable metal, which comprises placing surfaces of said members in abutting relation; pressing said members together while heating the metal members at and adjacent said contacting surfaces to a welding temperature by means of oxy-fuel gas flames directed upon said members at and adjacent said surfaces, thereby initiating the welding of such members at the interface formed by such contacting surfaces; thereupon increasing the force pressing said members together and progressively forcing upset metal at its ignition temperature outwardly at the periphery of said interface into the path of a sheet of a cutting gas containing oxygen directed to impinge upon the ridge of upset metal thus formed, thereby consuming and removing the upset metal as formed, generating and supplying additional welding heat to the members immediately adjacent said interface, and maintaining the lateral margins of the members adjacent the interface in approximately the original shape and size, while providing a relatively smooth welded joint; and discontinuing the oxy-fuel gas flames after initiation of the combustion of said upset metal.

7. Process for butt-welding members of weldable metal, which comprises placing surfaces of said members in abutting relation; forcing said members together with such surfaces in intimate contact under high pressure while heating the metal members at and adjacent said contacting surfaces to a welding temperature by means of oxy-fuel gas flames directed upon said members at and adjacent said surfaces, thereby initiating the welding of such members at the interface formed by such contacting surfaces and upsetting metal at and adjacent such interface; and progressively forcing such upset metal at its ignition temperature outwardly at the periphery of said interface into the path of a flowing body of a metal-combusting gas and into the path of oxy-fuel gas flames respectively directed transversely of the ridge of upset metal thus formed while reciprocating said body of metal-combusting gas and the last-named flames longitudinally of said ridge of upset metal, thereby consuming and removing such upset metal as formed, and generating additional welding heat at the surfaces of the members immediately adjacent said interface, while maintaining the lateral margins of the members adjacent the interface in preselected shape and size, and providing a smooth welded joint.

8. Process for butt-welding members of weldable metal, which comprises placing surfaces of said members in abutting relation; pressing said members together while heating the metal members at and adjacent said contacting surfaces to a welding temperature by means of oxy-fuel gas flames directed upon said members at and adjacent said surfaces, thereby initiating the welding of such members at the interface formed by such contacting surfaces; and progressively forcing metal thus upset outwardly at a lateral margin of said interface into the path of a stream of a metal-combusting gas directed longitudinally of the ridge of upset metal thus formed, thereby consuming and removing such upset metal as formed and generating additional welding heat at the surface of the members immediately adjacent said interface, while maintaining the lateral margins of the members adjacent the interface in preselected shape and size and providing a smooth welded joint.

9. Process for butt-welding members of weldable metal, which comprises longitudinally aligning two of such members having prepared surfaces with said surfaces in abutting relation to form an interface; forcing said surfaces together under pressure while directing a plurality of oxy-fuel gas welding flames upon at least two opposite surfaces of said members adjacent said abutting surfaces, thereby upsetting metal in the welding zone thus formed and producing a transverse ridge of upset metal; reciprocating said oxy-fuel gas flames across the interface formed by the abutting surfaces along a selected path of fixed length; thereafter directing into the origin of the ridge of upset metal a plurality of jets of an oxidizing gas reactive with said metal with the development of welding heat, thereby consuming successive portions of such upset metal immediately at the welding zone, and generating in the metal and conducting to the abutting surfaces additional welding heat, while maintaining the outer margins of such abutting surfaces in preselected shape and size; and moving said jets of oxidizing gas back and forth along a selected path of fixed length parallel to said interface.

10. Process for butt-welding members of weldable metal, which comprises longitudinally aligning two of such members having prepared surfaces with said surfaces in abutting relation; forcing said surfaces together under pressure while directing a plurality of oxy-fuel gas welding flames upon at least two opposite surfaces of said members adjacent said abutting surfaces, thereby upsetting metal in the welding zone thus formed; thereafter directing a plurality of heating flames and a plurality of jets of oxygen into the path of movement of the upset metal, thereby igniting and consuming successive portions of such upset metal immediately at the welding zone as rapidly as formed, while generating and conducting to the abutting surfaces additional welding heat, and while maintaining the outer margins of such abutting surfaces in preselected shape and size; and reciprocating said heating flames and said jets of oxygen as a unit transversely of the members along a selected path of fixed length.

11. Process for butt-welding members of weldable metal, which comprises placing surfaces of said members in abutting relation; forcing the members together under pressure while heating to a welding temperature the metal at and adjacent the interface formed by the abutting surfaces in a welding zone of fixed width, thereby upsetting metal at and adjacent said interface and heating the upset metal to its ignition temperature; directing a plurality of closely spaced oxygen jets and a plurality of oxy-fuel gas flames upon the upset metal thus produced, while moving said jets and flames back and forth longitudinally of said welding zone, thereby consuming the upset metal substantially as rapidly as formed and supplying to adjacent portions of the members welding heat produced by the combustion of the metal, while maintaining the outer surfaces of the members at the welded joint thus produced in a preselected shape and size.

12. Process for butt-welding members of weldable metal, which comprises placing surfaces of such members in abutting relation; forcing said surfaces together under pressure while heating the members adjacent the interface formed by said abutting surfaces to a welding temperature not substantially higher than the solidus temperature of the metal by heat conducted to said abutting surfaces through the metal members, thereby forcing laterally upset metal at and adjacent said interface; increasing the pressure forcing the surfaces together when such metal-upsetting is initiated; and thereupon progressively impinging a stream of a metal-consuming gas upon successive portions of the upset metal as such portions move laterally of said interface, thereby consuming and removing the upset metal, generating additional welding heat adjacent the abutting surface, and conducting such welding heat through the metal members to such surfaces.

13. Process for butt-welding members of weldable metal, which comprises placing surfaces of said members in abutting relation under high pressure; heating to a welding temperature the metal at and adjacent the interface formed by the abutting surfaces, thereby initiating the welding of the members at said interface; progressively forcing upset metal outwardly at the periphery of said interface into the path of a body of a metal-consuming gas flowing transversely across said interface, thereby consuming such upset metal as formed, producing a hot slag normally tending to deposit on the metal adjacent the welding zone, and generating additional welding heat at the surfaces of the members immediately adjacent said interface for completing the welding of said members; and directing a stream of a high-velocity gas upon the hot slag adjacent the welding zone for entraining the slag and removing it from the welding zone.

14. Process for butt-welding members of weldable metal, which comprises placing surfaces of said members in abutting relation; pressing said members together while heating the metal members at and adjacent the contacting surfaces to a welding temperature by means of oxy-fuel gas flames directed upon said members at and adjacent said surfaces, thereby initiating the welding of such members at the interface formed by such contacting surfaces, and forcing metal thus upset outwardly at the periphery of said interface; and progressively impinging a stream of a metal-combusting gas and a plurality of closely spaced oxy-fuel gas preheating flames upon successive portions of the upset metal as it moves laterally of said interface, while reciprocating said stream of gas and the last-named preheating flames longitudinally of the abutting surfaces of said members, thereby consuming and removing the upset metal thus formed, generating and supplying additional welding heat to the members immediately at the surface of the metal adjacent said interface, and maintaining the lateral margins of the members adjacent the interface in preselected shape and size.

15. Process for butt-welding members of weldable metal, which comprises placing surfaces of said members in abutting relation, forcing said members together under high pressure while heating the metal members at and adjacent the contacting surfaces to a welding temperature by means of oxy-fuel gas flames directed upon said members at and adjacent said surfaces, thereby initiating the welding of such members at the interface formed by such contacting surfaces and forcing upset metal at its ignition temperature outwardly at the periphery of said interface; thereafter increasing the force pressing said members together and progressively impinging a stream of a metal-combusting gas upon successive portions of the upset metal as it moves laterally of said interface, thereby combusting the upset metal thus formed, generating and supplying additional welding heat to the members immediately at the surface of the metal adjacent said interface, and maintaining the lateral margins of the members at the interface in preselected shape and size; and discontinuing the oxy-fuel gas flames after initiation of the combustion of said upset metal.

16. Apparatus for butt-welding members of weldable metal, which comprises, in combination, mechanism for aligning two of such members with a surface of each in intimate contact and for continuously maintaining the contacting surfaces in abutting relation during a welding operation; means for directing welding heat upon at least two opposite surfaces of each of said members at and adjacent the abutting surfaces; pressure-applying means for forcing together said abutting surfaces under a selected pressure, and for extruding outwardly metal softened by said welding heat; means for directing a plurality of jets of oxygen into the path of the extruded metal for combusting such extruded metal; and means for reciprocating said oxygen jets along a selected path extending transversely of the members being welded while said pressure-applying means is operative for applying such pressure.

17. Apparatus for butt-welding members of weldable metal, which comprises, in combination, mechanism for aligning two of such members with a surface of each in intimate contact to form an interface; means for directing welding heat upon at least two opposite surfaces of each of said members at and adjacent said interface; means for pressing said contacting members together under a selected pressure, thereby progressively extruding outwardly metal softened by said welding heat and shifting said interface; means for directing jets of oxygen into the path of movement of the extruding metal and for consuming such extruded metal; and means operatively associated with said oxygen jet-directing means for continuously maintaining said oxygen jets in fixed spaced relation with said interface during shifting of the latter due to upsetting of the metal.

18. Apparatus for butt-welding members of weldable metal, which comprises, in combination, mechanism for aligning two of such members with a surface of each in intimate contact to form an interface; means for directing welding heat upon at least two opposite surfaces of each of said members at and adjacent said interface; means for forcing said contacting members together under a selected pressure, for progressively extruding outwardly metal softened by said welding heat, and for shifting said interface; means for directing a plurality of closely spaced jets of oxygen into the path of movement of the extruding metal and for consuming such extruded metal; means for moving said oxygen jets back and forth longitudinally of the said interface along a fixed path of selected length; means for regulating the length of said path; and means operatively associated with said oxygen jet-directing means for continuously maintaining said oxygen jets in fixed spaced relation with said interface during shifting of the latter due to upsetting of the metal.

19. Apparatus for butt-welding members of weldable metal, which comprises, in combination, mechanism for aligning two of such members with a surface of each in intimate contact, and for continuously maintaining such surfaces in abutting relation during a welding operation; means for directing welding heat upon at least two opposite surfaces of each of such members at and adjacent the abutting surfaces; pressure-applying means for forcing together said abutting surfaces under high pressure and for extruding outwardly metal softened by said welding heat; means for directing a stream of oxygen into the path of the extruded metal for combusting the latter and producing additional welding heat for completing the welding of said members; and means for directing a stream of a high velocity gas into the path of movement of the stream of oxygen and combustion products at a point in the path beyond its point of contact with said extruded metal, for entraining and removing from the welding zone hot slag formed by combustion of said metal.

EGON B. SCHERL.